United States Patent [19]

Ohmori et al.

[11] Patent Number: 5,402,397
[45] Date of Patent: Mar. 28, 1995

[54] ELECTROMAGNETIC SHIELD DEVICE FOR MAGNETO-OPTICAL RECORDING APPARATUS

[75] Inventors: Takashi Ohmori, Tokyo; Hajime Yano, Kanagawa; Kazuhiko Fujiie, Tokyo, all of Japan

[73] Assignee: Sony Corporation, Japan

[21] Appl. No.: 136,952

[22] Filed: Oct. 13, 1993

[30] Foreign Application Priority Data

Oct. 14, 1992 [JP] Japan .................................. 4-276215

[51] Int. Cl.6 ............................................ G11B 13/04
[52] U.S. Cl. ..................................... 369/13; 360/114
[58] Field of Search ..................... 369/13, 14; 360/59, 360/114, 102, 103, 128, 129; 365/122

[56] References Cited

U.S. PATENT DOCUMENTS

| | | | |
|---|---|---|---|
| 5,072,431 | 12/1991 | Ohmori et al. | 369/13 |
| 5,093,816 | 3/1992 | Taniguchi et al. | 369/13 |
| 5,107,471 | 4/1992 | Miyake et al. | 369/13 |
| 5,151,837 | 9/1992 | Wakasugi et al. | 360/103 |

FOREIGN PATENT DOCUMENTS

| | | | |
|---|---|---|---|
| 0390260A1 | 10/1990 | European Pat. Off. | |
| 1151002 | 6/1989 | Japan | 369/13 |
| 1194110 | 8/1989 | Japan | 369/13 |
| 520609 | 1/1993 | Japan | 369/13 |
| 520724 | 1/1993 | Japan | 369/13 |

OTHER PUBLICATIONS

Patent Abstracts of Japan, vol. 15, No. 23 (P-21155), 18 Jan. 1991 & JP-A-22 65 059 (Ricoh Co. Ltd.), 29 Oct. 1990.
Patent Abstracts of Japan, vol. 14, No. 195 (P-1039), 20 Apr. 1990 & JP-A-20 37 550 (Canon Inc.), 7 Feb. 1990.
Patent Abstracts of Japan, vol. 5, No. a 84 (P-064), 2 Jun. 1981 & JP-A-56 029 868 (Mitsubishi Electric Corp.), 25 Mar. 1981.
Patent Abstracts of Japan, vol. 9, No. 323 (P-414), 18 Dec. 1985 & JP-A-60 147 949 (Canon K.K.), 5 Aug. 1985.
Patent Abstracts of Japan, vol. 8, No. 223 (P-307), 12 Oct. 1984 & JP-A-59 104 723 (Matsushita Denki Sangyo K.K.), 16 Jun. 1984.
Patent Abstracts of Japan, vol. 15, No. 281 (P-1228), 17 Jul. 1991 & JP-A-30 95 717 (Fujitsu Ltd.), 22 Apr. 1991.

*Primary Examiner*—Robert J. Pascal
*Assistant Examiner*—Tan Dinh
*Attorney, Agent, or Firm*—Alan S. Hodes

[57] ABSTRACT

An optical head applies a laser beam to a region of the magnetooptical disc, and a magnetic head applies a magnetic field to the region of the magnetooptical disc while the laser beam is being applied thereto, thereby to record information in the region. The optical and magnetic heads are interconnected by a link mechanism so that they are movable in unison with each other radially with respect to the magnetooptical disc. An electromagnetic shield is disposed around the magnetic head for blocking magnetic and electric fields parallel to the magnetooptical disc.

12 Claims, 6 Drawing Sheets

ELECTROMAGNETIC SHIELD DEVICE FOR MAGNETO-OPTICAL RECORDING APPARATUS

BACKGROUND OF THE INVENTION

1. Field of the Invention

The present invention relates to a magnetooptical disc recording apparatus having an optical head and a magnetic head, and more particularly to a magnetooptical disc recording apparatus having a means for lessening the effect of magnetic and electric fields on a magnetic head.

2. Description of the Prior Art

Heretofore, magnetooptical disc recording apparatus employ a magnetooptical disc as a recording medium for magnetooptically recording information thereon. The magnetooptical disc has a magnetic film which is easily magnetizable in a direction perpendicular to the surface of the magnetic film, the magnetic film having a large coercive force. A small region on the magnetic film is heated by a laser beam or the like, and a magnetic field is applied to reverse the direction of magnetization in the heated region, thus producing a recorded bit on the magnetic film. The information represented by the recorded bit can be reproduced using the magnetooptical effect. The magnetooptical disc recording apparatus have an optical head and a magnetic head that are positioned one on each side of the magnetooptical disc in confronting relationship to each other. The optical head and the magnetic head are structurally coupled to each other by a link mechanism. When the magnetooptical disc rotates or any location thereon is to be accessed by the optical and magnetic heads, the optical and magnetic heads are movable in unison with each other to record desired information on and reproduce recorded information from the magnetooptical disc.

The magnetic head comprises an assembly of a coil, a core with the coil mounted thereon, and a holder which positions the coil and the core in place. It is necessary to provide against electromagnetic inductions, i.e., effects which the magnetic field generated by the magnetic head has on other components and devices, and effects which the magnetic fields generated by other components and devices have on the magnetic head.

Figure 1:
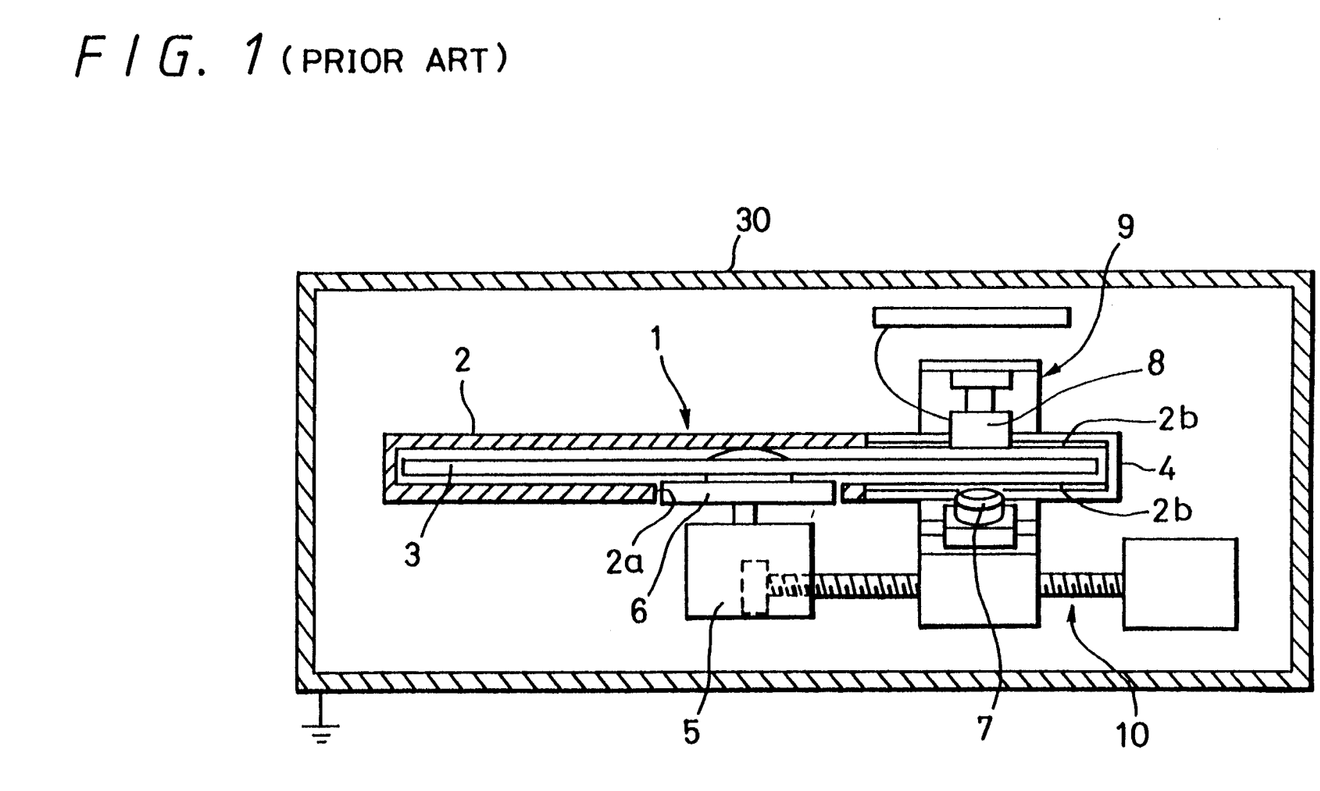
FIG. 1 is a schematic elevational view, partly in cross section, of a conventional magnetooptical disc recording apparatus.

FIG. 1 of the accompanying drawings shows one conventional measure against electromagnetic inductions which comprises an electromagnetic shield box 30 that houses a magnetooptical disc recording apparatus for thereby electromagnetically shielding the entire apparatus. As shown in FIG. 1, the magnetooptical disc recording apparatus includes a disc cartridge assembly 1 having a cartridge 2 composed of a pair of upper and lower cartridge members. The lower cartridge member has a central opening 2a defined therein, and the upper and lower cartridge members have respective windows 2b defined respectively therein near one side edge thereof. The cartridge 2 accommodates therein a magnetooptical disc 3 which is partly exposed through the windows 2b that can selectively be opened and closed by a shutter 4.

A spindle motor 5 has a rotatable shaft connected coaxially to a turntable 6 rotatably disposed in the central opening 2a in the lower cartridge member. The magnetooptical disc 3 is supported on the turntable 6, so that it can be rotated in the cartridge 2 when the spindle motor 5 is energized. The magnetooptical disc recording apparatus also includes an optical head 7 and a magnetic head 8 that vertically confront each other and are movably positioned in the respective windows 2b in the upper and lower cartridge members. The optical and magnetic heads 7, 8 are supported by a link mechanism 9, one on each side of the cartridge 2, i.e., one on each side of the magnetooptical disc 3 housed therein. The link mechanism 9 is reciprocally movable radially with respect to the magnetooptical disc 3 by a feed mechanism 10 which comprises a motor and a feed shaft coupled thereto.

When the magnetooptical disc 3 is rotated or is to be accessed by the optical and magnetic heads 7, 8, the optical and magnetic heads 7, 8 are moved in unison with each other radially with respect to the magnetooptical disc 3 by the feed mechanism 10 through the link mechanism 9 to record desired information on and reproduce recorded information from the magnetooptical disc 3.

Since the magnetooptical disc recording apparatus is electromagnetically shielded in its entirety by the electromagnetic shield box 30 which houses the magnetooptical disc recording apparatus, the overall assembly is relatively large in size and weight, and costly because of the additional magnetic shield box 30. Therefore, the conventional electromagnetic shield structure has been contrary to efforts to meet requirements for cutdowns in the size, weight, and cost of the overall assembly.

OBJECTS AND SUMMARY OF THE INVENTION

It is therefore an object of the present invention to provide a magnetooptical disc recording apparatus which has a means for absorbing magnetic and electric fields in the vicinity of a magnetic head to reduce effects, such as radio signal reception failures, which magnetic fields relative to the magnetic head have on the magnetic head itself or other components or devices.

Another object of the present invention is to provide a magnetooptical disc recording apparatus which includes a magnetic head that is directly combined with a relatively simple measure against electromagnetic inductions, thereby making the magnetooptical disc recording apparatus relatively small and lightweight.

According to the present invention, there is provided a magnetooptical disc recording apparatus comprising an optical head for applying a laser beam to one surface of a recordable magnetooptical disc to record information on the recordable magnetooptical disc, a magnetic head for generating a magnetic field depending on the information to be recorded on an opposite surface of the recordable magnetooptical disc while the laser beam is being applied by the optical head, a link mechanism connecting the optical head and the magnetic head to each other for moving the optical head and the magnetic head in unison with each other radially with respect to the recordable magnetooptical disc, and an electromagnetic shield movable in unison with the magnetic head for absorbing magnetic and electric fields which are produced parallel to the recordable magnetooptical disc by the magnetic head.

The magnetic head may comprise a magnetic core, a coil mounted on the magnetic core, and a head holder holding the magnetic core, the electromagnetic shield being fixed to a peripheral edge of the head holder. The head holder and the electromagnetic shield may bee formed integrally with each other by insert molding.

The link mechanism may have a head support arm, the magnetic head being attached to one end of the head support arm, the electromagnetic shield being attached to the head support arm.

The electromagnetic shield may comprise a ring shield fitted over the magnetic head and dimensioned substantially complementarily to the magnetic head.

According to the present invention, there is also provided a magnetooptical disc recording apparatus comprising an optical head for applying a laser beam to one surface of a recordable magnetooptical disc to record information on the recordable magnetooptical disc, a magnetic head for generating a magnetic field depending on the information to be recorded on an opposite surface of the recordable magnetooptical disc while the laser beam is being applied by the optical head, a link mechanism connecting the optical head and the magnetic head to each other for moving the optical head and the magnetic head in unison with each other radially with respect to the recordable magnetooptical disc, the link mechanism having a head support arm, the magnetic head being attached to an end of the head support arm, an electromagnetic shield disposed around the magnetic head for absorbing magnetic and electric fields which are produced parallel to the recordable magnetooptical disc by the magnetic head, and a shield support arm disposed independently of the head support arm, the electromagnetic shield being resiliently supported on the shield support arm.

The electromagnetic shield may comprise a frame, the magnetic head is movable in the frame.

The magnetooptical disc recording apparatus may further comprise a cartridge having a window, the recordable magnetooptical disc being rotatably housed in the cartridge, the magnetic head being disposed in confronting relationship to the recordable magnetooptical disk through the window, the electromagnetic shield comprising a frame complementary in shape to the window. The magnetooptical disc recording apparatus may also comprise a spring for normally urging the electromagnetic shield in a direction to contact the cartridge.

According to the present invention, there is further provided an apparatus for magnetooptically recording information on a magnetooptical disc, comprising an optical head for applying a laser beam to a region of the magnetooptical disc, a magnetic head movable with the optical head radially with respect to the magnetooptical disc, for applying a magnetic field to the region of the magnetooptical disc while the laser beam is being applied thereto, thereby to record information in the region, and an electromagnetic shield disposed around the magnetic head for blocking magnetic and electric fields parallel to the magnetooptical disc.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENTS

Like or corresponding parts are denoted by like or corresponding reference numerals throughout views.

Figure 2:
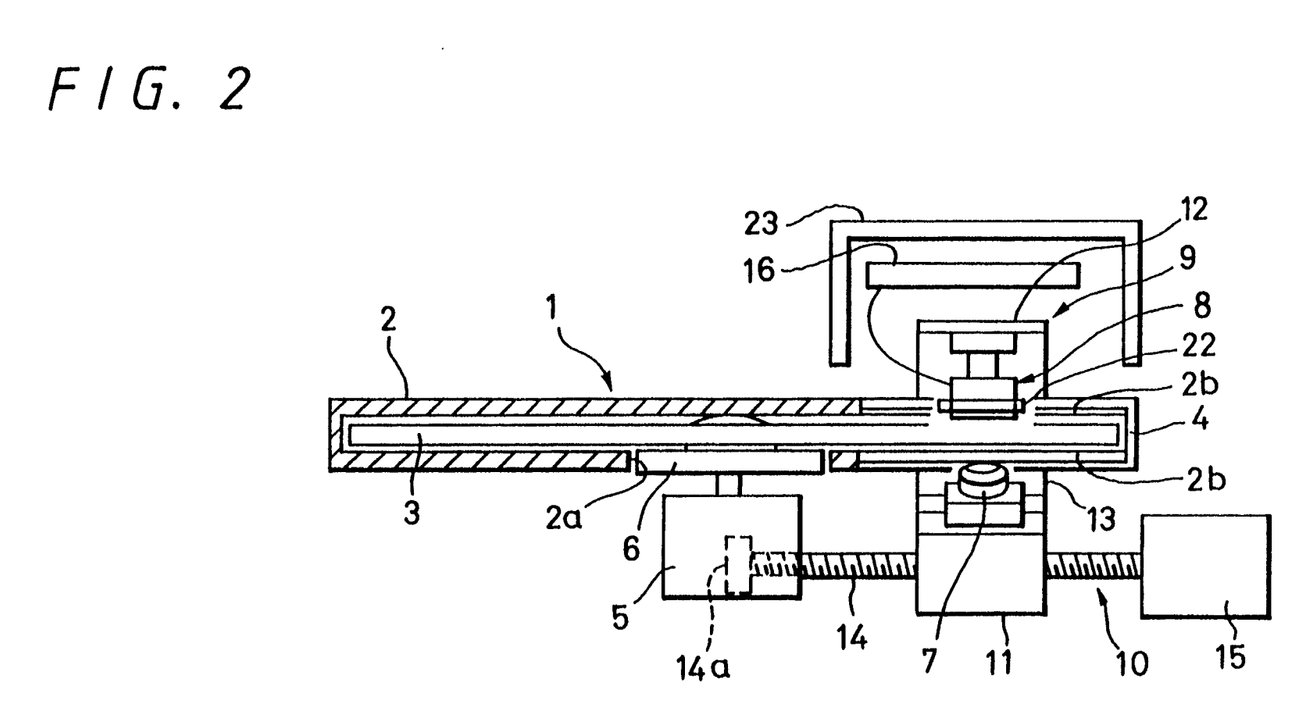
FIG. 2 is a schematic elevational view, partly in cross section, of a magnetooptical disc recording apparatus according to a first embodiment of the present invention.

As shown in FIG. 2, a magnetooptical disc recording apparatus according to a first embodiment of the present invention includes a disc cartridge assembly 1 comprising a cartridge 2 composed of a pair of upper and lower cartridge members, a recordable magnetooptical disc 3 rotatably housed in the cartridge 2, and a shutter 4 for selectively opening and closing windows 2b defined in the respective upper and lower cartridge members of the cartridge 2. When the windows 2b are opened by the shutter 4, a portion of the magnetooptical disc 3 is exposed through the windows 2b. The magnetooptical disc 3 is detachably supported on a turntable 6 rotatably disposed in a central opening 2a defined in the lower cartridge member. The turntable 6 is coaxially coupled to the drive shaft of a spindle motor 5. Therefore, the magnetooptical disc 3 can be rotated in the cartridge 2 when the spindle motor 5 is energized.

The magnetooptical disc recording apparatus also includes an optical head 7 and a magnetic head 8 that vertically confront each other and are movably positioned in the respective windows 2b in the upper and lower cartridge members. The optical and magnetic heads 7, 8 are supported by a channel-shaped link mechanism 9, one on each side of the cartridge 2, i.e., one on each side of the magnetooptical disc 3 housed therein. When the magnetooptical disc 3 is rotated or any location thereon is to be accessed by the optical and magnetic heads 7, 8, the optical and magnetic heads 7, 8 are movable in unison with each other through the link mechanism 9. The link mechanism 9 comprises a lower link 11 having an upper surface on which the optical head 7 is fixedly mounted, a head support arm 12 having a lower surface on which the magnetic head 8 is fixedly supported, and a side link 13 interconnecting the lower link 11 and the head support arm 12 laterally of the magnetooptical disc 3.

The link mechanism 9 and hence the optical and magnetic heads 7, 8 are movable radially with respect to the magnetooptical disc 3 by a feed mechanism 10 that comprises a feed shaft 14 and a motor 15. The feed shaft 14 threadedly extends through the lower link 11 in the radial direction of the magnetooptical disc 3, and has one end rotatably supported by a bearing 14a. The motor 15 is coupled to the other end of the feed shaft 14 for rotating the feed shaft 14 about its own axis. When the motor 15 is energized, the link mechanism 9 is moved on and along the feed shaft 14, causing the optical and magnetic heads 7, 8 along the surface of the magnetooptical disc 3 radially with respect to the magnetooptical disc 3. The optical head 7 is electrically connected to a high-frequency amplifier (not shown), and the magnetic head 8 is electrically connected to a driver circuit 16.

Figure 3:
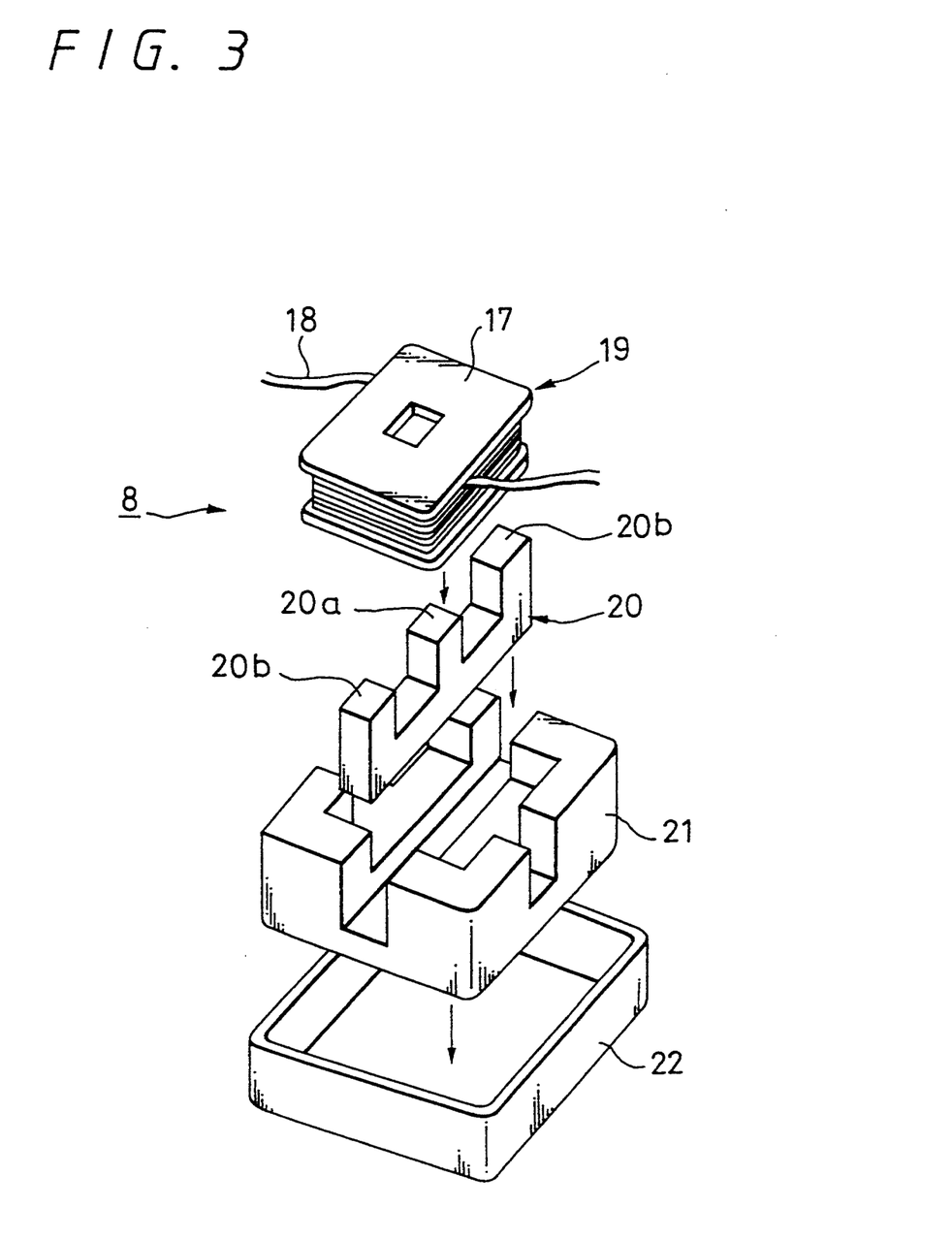
FIG. 3 is an exploded perspective view of a magnetic head of the magnetooptical disc recording apparatus shown in FIG. 2.

As shown in FIG. 3, the magnetic head 8 comprises a coil assembly 19 having a bobbin 17 and a coil 18 wound thereon, a substantially E-shaped ferrite core 20 having a central core member 20a and a pair of side core members 20b disposed one on each side of the central core member 20a, and a rectangular head holder 21 holding the coil assembly 19 and the ferrite core 20 with the central core member 20a inserted in a central opening defined in the bobbin 17. The ferrite core 20 can generate a magnetic field in a wide area as disclosed in detail in U.S. Pat. No. 5,072,431, for example. The bobbin 17 and the head holder 21 are formed of a plastic material such as polyamide, polyphenylene sulfide, polyarylate, or the like by insert molding.

The magnetic head 8 is fitted in an electromagnetic shield in the form of a shield ring 22. The shield ring 22 is of a rectangular annular shape having dimensions substantially complementary to the outer dimensions of the head holder 21. The shield ring 22 is made of a material having a small electric resistance, e.g., copper, and is forced-fitted over the head holder 21 so that the head holder 21 and the shield ring 22 are integrally joined to each other. The shield ring 22 has a thickness which is preferably in the range of from 10 $\mu m$ to 50 $\mu m$ if the magnetooptical disc recording apparatus uses compact discs or mini discs. The electromagnetic shield effect of the shield ring 22 remains the same if the thickness thereof is in excess of the above range. The driver circuit 16 is surrounded by another electromagnetic shield in the form of a metallic frame 23 (see FIG. 2).

Operation of the magnetooptical disc recording apparatus will be described below. When the magnetooptical disc recording apparatus is started, the spindle motor 5 is energized to cause the turntable 6 to rotate the magnetooptical disc 3. The feed mechanism 10 is actuated to enable the ring mechanism 9 to move the optical and magnetic heads 7, 8 in unison radially over to access a desired location on the magnetooptical disc 3.

When the optical and magnetic heads 7, 8 reach the desired location on the magnetooptical disc 3, the optical head 7 applies a laser beam to the lower surface of the magnetooptical disc 3 and the magnetic head 8 varies the direction of magnetization on the upper surface of the magnetooptical disc 3 by varying the direction of a current flowing through the coil 18. To record information on the magnetooptical disc 3, the direction of magnetization is varied depending on the information to be recorded in the vicinity of the laser beam spot that is applied to a recording region. To reproduce recorded information from the magnetooptical disc 3, the recorded information in the laser beam spot is read as a change in the direction of magnetization.

Only a vertical component of the magnetic field generated by the magnetic head 8, which vertical component is perpendicularly to the magnetooptical disc 3, is required for recording desired information on and reproducing recorded information from the magnetooptical disc 3, A horizontal component of the magnetic field is not only unnecessary, but also harmful as it adversely affects other components and devices for undesirable electromagnetic inductions. According to the present invention, such a horizontal component of the magnetic field is absorbed by the shield ring 22 disposed around the magnetic head 8.

As the horizontal component of the magnetic field generated by the magnetic head 8 does not act on other components and devices, adverse effects such as radio signal reception failures, which would otherwise result from the horizontal component of the magnetic field, are prevented from occurring. Nevertheless, desired information can reliably be recorded on and reproduced from the magnetooptical disc 3 because the shield ring 22 does not affect the vertical component of the magnetic field that is necessary for recording and reproducing desired information. The driver circuit 16 connected to the magnetic head 8 is also electromagnetically shielded by the metallic frame 23 for protection from magnetic and electric fields. The shield ring 22 and the metallic frame 23 are relatively simple in structure, small in size, and inexpensive to manufacture.

Figure 4:
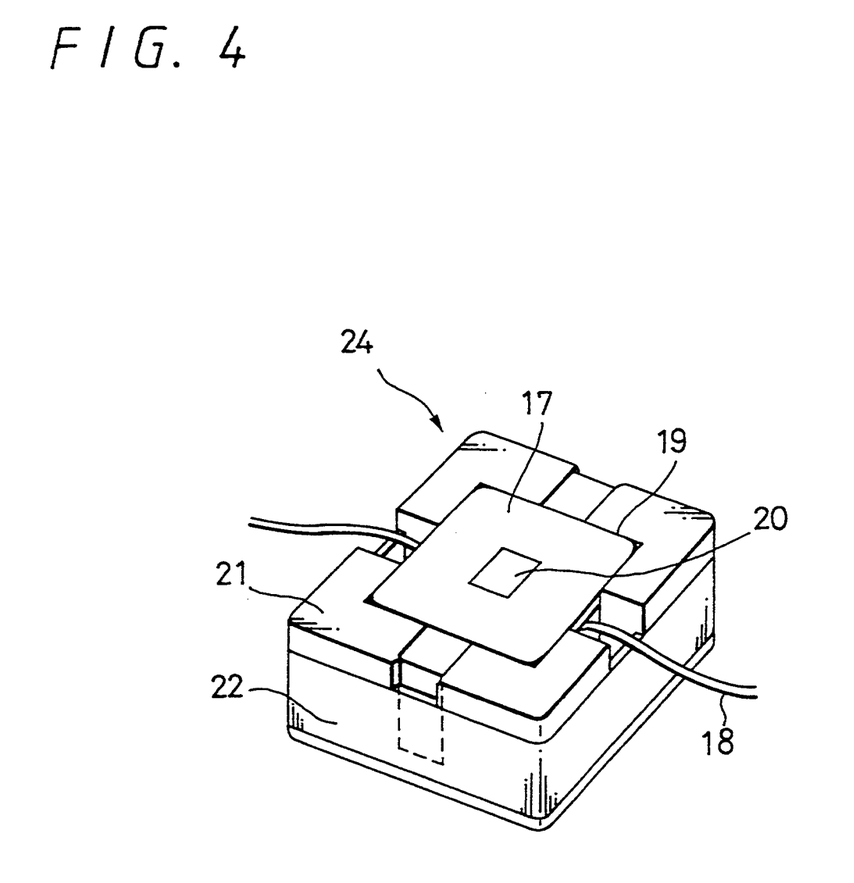
FIG. 4 is a perspective view of a modified magnetic head.

FIG. 4 shows a modified magnetic head 24. The magnetic head 24 is electromagnetically shielded by a shield ring 22 which is insert-molded integrally with the head holder 21 that holds the coil assembly 19 and the ferrite core 20. The magnetic head 24 shielded by the shield ring 22 can be assembled relatively simply because the shield ring 22 is not required to be force-fitted over the head holder 21.

Figure 5:
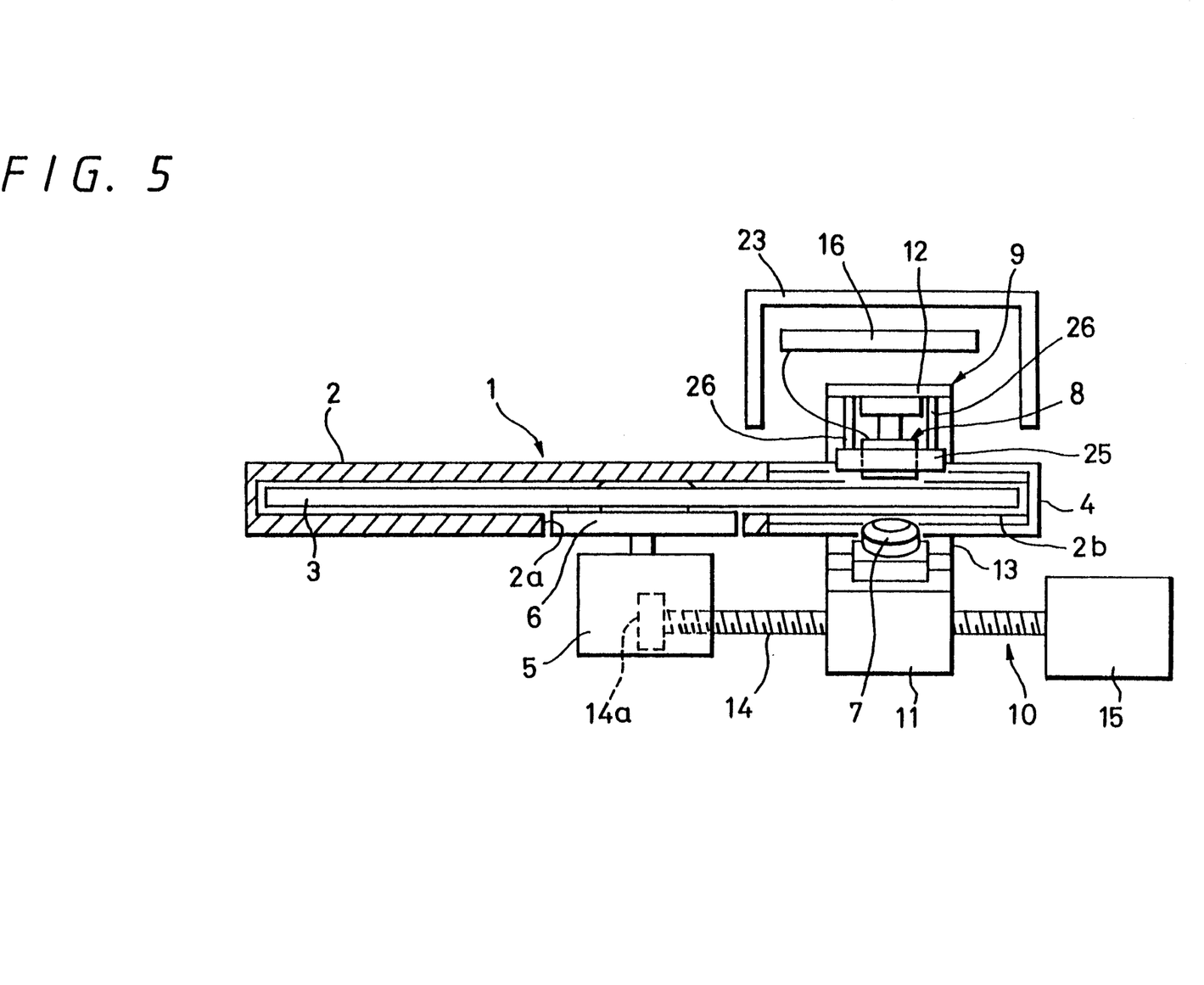
FIG. 5 is a schematic elevational view, partly in cross section, of a magnetooptical disc recording apparatus according to a second embodiment of the present invention.

According to a second embodiment shown in FIG. 5, an electromagnetic shield 25 disposed around the magnetic head 8 is attached to the head support arm 12. The electromagnetic shield 25 is of an annular shape slightly larger than the magnetic head 8, and a plurality of vertical joint rods 26 have lower ends connected to an upper surface of the electromagnetic shield 25. The upper ends of the joint rods 26 are connected to the head support arm 12. The electromagnetic shield 25 is thus supported by the head support arm 12 substantially concentrically to the magnetic head 8 which is positioned at least partially in the electromagnetic shield 25. The other structural details of the magnetooptical disc recording apparatus shown in FIG. 5 are the same as those of the magnetooptical disc recording apparatus according to the first embodiment shown in FIG. 2.

The electromagnetic shield 25 disposed around the magnetic head 8 is as effective to electromagnetically shield the magnetic head 8 in the horizontal direction as the shield ring 22 shown in FIGS. 2 through 4. In addition, since the electromagnetic shield 25 is attached to the head support arm 12, the weight of the magnetic head 8 is comparatively small, i.e., is not increased by the electromagnetic shield 25. Therefore, any adverse effects which the weight of the magnetic head 8 has on its distance servo control, are minimized. Since the magnetic head 8 and the electromagnetic shield 25 move in unison with each other though they are separate from each other, any new magnetic field is generated which would otherwise be produced by relative movement of the magnetic head 8 and the electromagnetic shield 25.

Figure 6:
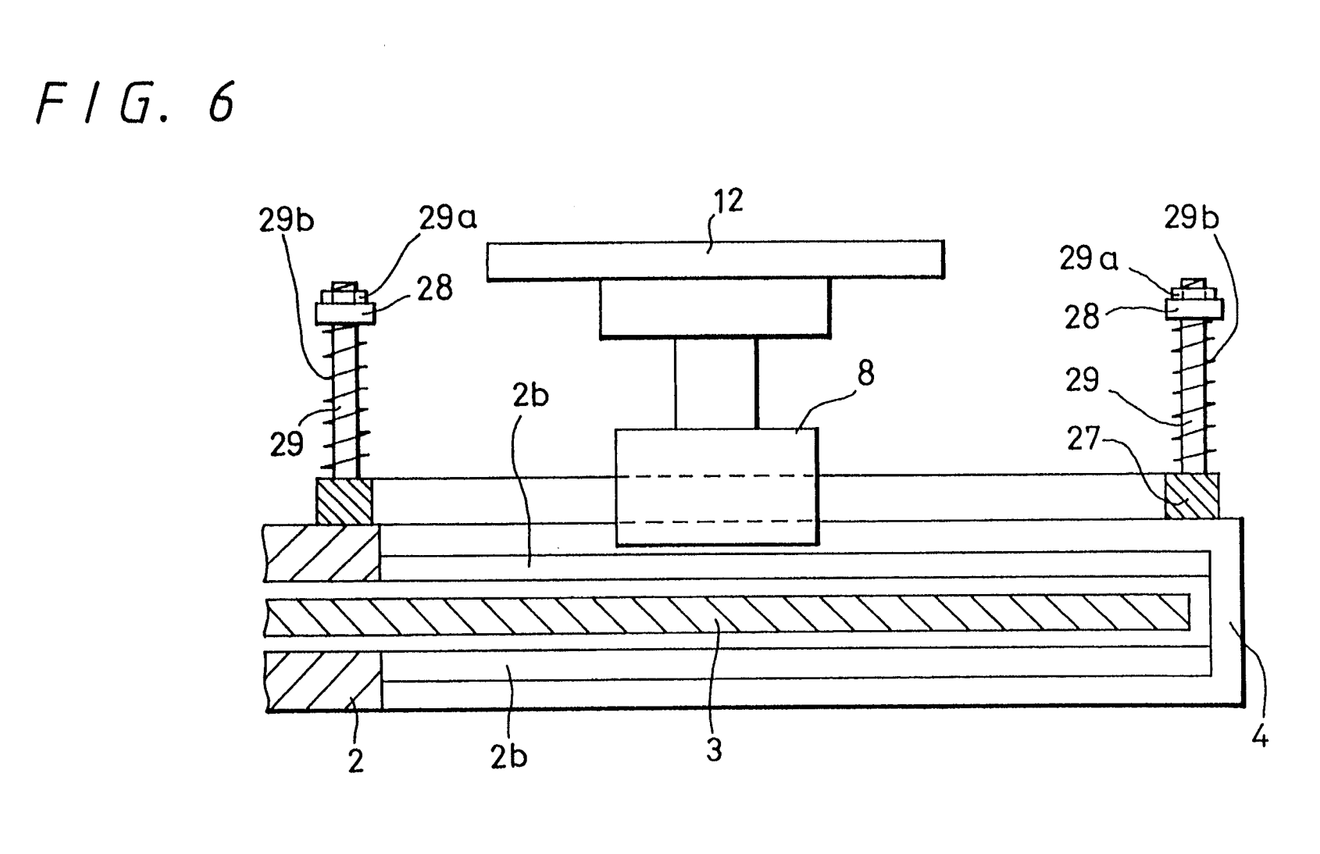
FIG. 6 is an enlarged fragmentary elevational view, partly in cross section, of a magnetooptical disc recording apparatus according to a third embodiment of the present invention.

FIG. 6 fragmentarily shows at enlarged scale magnetooptical disc recording apparatus according to a third embodiment of the present invention. As shown in FIG. 6, an electromagnetic shield 27 is in the form of an elongate rectangular frame longitudinally extending over the stroke of movement of the magnetic head 8 and having a shape substantially complementary to the shape of the windows 2b. The electromagnetic shield 27 is resiliently supported by a pair of shield support arms 28 positioned at respective ends of the stroke of movement of the magnetic head 8. The shield support arms 28 are separate from the head support arm 12, and are vertically movable in unison with the head support arm 12. Upper ends of joint rods 29 extend through the distal ends of the shield support arms 28, respectively, and are retained on the shield support arms 28 by nuts 29a threaded over the respective upper ends of the joint rods 29. The electromagnetic shield 27 is secured to the lower ends of the joint rods 29. The electromagnetic shield 27 is normally urged resiliently in a direction to contact the disc cartridge assembly 1 under the forces of coil springs 29b that are disposed around the respective joint rods 29 under compression between the shield support arms 28 and the electromagnetic shield 27.

When the shield support arms 28 are lowered, the electromagnetic shield 27 is positioned in abutment against the cartridge 2 around the openings 2b. In operation, the magnetic head 8 is movable within the electromagnetic shield 27. The electromagnetic shield 27 is also as effective to electromagnetically shield the magnetic head 8 in the horizontal direction as the electromagnetic shield 25 shown in FIG. 5.

Additionally, inasmuch as the electromagnetic shield 27 is attached to the shield support arm 28 separate from the head support arm 12, the weight of the magnetic head 8 remains relatively small, i.e., is not increased by the electromagnetic shield 27. Therefore, any adverse effects which the weight of the magnetic head 8 has on its distance servo control, are minimized. The electromagnetic shield 27 is positioned by the upper surface of the cartridge 2, and can reliably shut unwanted magnetic and electric fields out of the range in which the magnetic head 8 is movable or block unwanted magnetic and electric fields against entry into the range in which the magnetic head 8 is movable. Therefore, any adverse effects that the electromagnetic shield 27 would have on the magnetic head 8 if the electromagnetic shield 27 moved are eliminated.

While the magnetic heads 8, 24 in the above embodiments are shown as rectangular in shape as viewed in plan, they may be of a circular or other shape. In the second embodiment, only one joint rod 26 may be used to interconnect the electromagnetic shield 25 and the head support arm 12.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A magnetooptical disc recording apparatus comprising:
   an optical head for applying a laser beam to one surface of a recordable magnetooptical disc to record information on the recordable magnetooptical disc;
   a magnetic head for generating a magnetic field depending on the information to be recorded on an opposite surface of the recordable magnetooptical disc while the laser beam is being applied by said optical head;
   a link mechanism connecting said optical head and said magnetic head to each other for moving said optical head and said magnetic head in unison with each other radially with respect to the recordable magnetooptical disc;
   a first electromagnetic shield movable in unison with said magnetic head for absorbing magnetic and electric fields which are produced parallel to the recordable magnetooptical disc by said magnetic head;
   a drive circuit electrically connected to said magnetic head; and
   a second electromagnetic shield surrounding said drive circuit for absorbing magnetic and electric fields produced by said drive circuit.

2. A magnetooptical disc recording apparatus according to claim 1, wherein said magnetic head comprises a magnetic core, a coil mounted on said magnetic core, and a head holder holding said magnetic core, said electromagnetic shield being fixed to a peripheral edge of said head holder.

3. A magnetooptical disc recording apparatus according to claim 2, wherein said head holder and said electromagnetic shield are formed integrally with each other by insert molding.

4. A magnetooptical disc recording apparatus according to claim 1, wherein said link mechanism has a head support arm, said magnetic head being attached to one end of said head support arm, said electromagnetic shield being attached to said head support arm.

5. A magnetooptical disc recording apparatus according to claim 1, wherein said electromagnetic shield comprises a ring shield fitted over said magnetic head and dimensioned substantially complementarily to said magnetic head.

6. A magnetooptical disc recording apparatus comprising:
   an optical head for applying a laser beam to one surface of a recordable magnetooptical disc to record information on the recordable magnetooptical disc;
   a magnetic head for generating a magnetic field depending on the information to be recorded on an opposite surface of the recordable magnetooptical disc while the laser beam is being applied by said optical head;
   a link mechanism connecting said optical head and said magnetic head to each other for moving said optical head and said magnetic head in unison with each other radially with respect to the recordable magnetooptical disc, said link mechanism having a head support arm, said magnetic head being attached to an end of said head support arm;
   an electromagnetic shield disposed around said magnetic head for absorbing magnetic and electric fields which are produced parallel to the recordable magnetooptical disc by said magnetic head;
   a shield support arm disposed independently of said head support arm, said electromagnetic shield being resiliently supported on said shield support arm;
   a drive circuit electrically connected to said magnetic head; and
   a second electromagnetic shield surrounding said drive circuit for absorbing magnetic and electric fields produced by said drive circuit.

7. A magnetooptical disc recording apparatus according to claim 6, wherein said electromagnetic shield comprises a frame, said magnetic head is movable in said frame.

8. A magnetooptical disc recording apparatus according to claim 6, further comprising a cartridge having a window, said recordable magnetooptical disc being rotatably housed in said cartridge, said magnetic head being disposed in confronting relationship to said recordable magnetooptical disk through said window, said electromagnetic shield comprising a frame complementary in shape to said window.

9. A magnetooptical disc recording apparatus according to claim 8, further comprising a spring for normally urging said electromagnetic shield in a direction to contact said cartridge.

10. An apparatus for magnetooptically recording information on a magnetooptical disc, comprising;
- an optical head for applying a laser beam to a region of the magnetooptical disc;
- a magnetic head movable with said optical head radially with respect to the magnetooptical disc, for applying a magnetic field to the region of the magnetooptical disc while the laser beam is being applied thereto, thereby to record information in said region;
- an electromagnetic shield disposed around said magnetic head for blocking magnetic and electric fields parallel to the magnetooptical disc;
- a drive circuit electrically connected to said magnetic head; and
- a second electromagnetic shield surrounding said drive circuit for absorbing magnetic and electric fields produced by said drive circuit.

11. A magnetooptical disc recording apparatus comprising:
- an optical head for applying a laser beam to one surface of a recordable magnetooptical disc to record information on the recordable magnetooptical disc;
- a magnetic head for generating a magnetic field depending on the information to be recorded on an opposite surface of the recordable magnetooptical disc while the laser beam is being applied by said optical head;
- a link mechanism connecting said optical head and said magnetic head to each other for moving said optical head and said magnetic head in unison with each other radially with respect to the recordable magnetooptical disc, said link mechanism having a head support arm, said magnetic head being attached to an end of said head support arm;
- an electromagnetic shield disposed around said magnetic head for absorbing magnetic and electric fields which are produced parallel to the recordable magnetooptical disc by said magnetic head; and
- a shield support arm disposed independently of said head support arm, said electromagnetic shield being resiliently supported on said shield support arm,
- wherein said electromagnetic shield comprises a frame, said magnetic head is movable in said frame.

12. A magnetooptical disc recording apparatus comprising:
- an optical head for applying a laser beam to one surface of a recordable magnetooptical disc to record information on the recordable magnetooptical disc;
- a magnetic head for generating a magnetic field depending on the information to be recorded on an opposite surface of the recordable magnetooptical disc while the laser beam is being applied by said optical head;
- a link mechanism connecting said optical head and said magnetic head to each other for moving said optical head and said magnetic head in unison with each other radially with respect to the recordable magnetooptical disc, said link mechanism having a head support arm, said magnetic head being attached to an end of said head support arm;
- an electromagnetic shield disposed around said magnetic head for absorbing magnetic and electric fields which are produced parallel to the recordable magnetooptical disc by said magnetic head; and
- a shield support arm disposed independently of said head support arm, said electromagnetic shield being resiliently supported on said shield support arm;
- a cartridge having a window, said recordable magnetooptical disc being rotatably housed in said cartridge, said magnetic head being disposed in confronting relationship to said recordable magnetooptical disk through said window, said electromagnetic shield comprising a frame complementary in shape to said window; and
- a spring for normally urging said electromagnetic shield in a direction to contact said cartridge.

* * * * *